(12) United States Patent
Coelho De Souza et al.

(10) Patent No.: US 11,031,824 B2
(45) Date of Patent: Jun. 8, 2021

(54) APPARATUS AND METHOD FOR RF ENERGY HARVESTING

(71) Applicant: Drayson Technologies (Europe) Limited, London (GB)

(72) Inventors: Aline Coelho De Souza, London (GB); Bruno Roberto Franciscatto, London (GB); Manuel Pinuela Rangel, London (GB); Vitor Freitas, London (GB); Diana Stefan, London (GB)

(73) Assignee: DRAYSON TECHNOLOGIES (EUROPE) LIMITED, London (GB)

( * ) Notice: Subject to any disclaimer, the term of this patent is extended or adjusted under 35 U.S.C. 154(b) by 55 days.

(21) Appl. No.: 16/336,612

(22) PCT Filed: Aug. 17, 2017

(86) PCT No.: PCT/GB2017/052446
§ 371 (c)(1),
(2) Date: Mar. 26, 2019

(87) PCT Pub. No.: WO2018/033748
PCT Pub. Date: Feb. 22, 2018

(65) Prior Publication Data
US 2019/0260239 A1    Aug. 22, 2019

(30) Foreign Application Priority Data

Aug. 17, 2016 (GB) ...................................... 1614088
Jan. 13, 2017 (GB) ...................................... 1700661

(51) Int. Cl.
*H02J 50/27* (2016.01)
*H02J 50/10* (2016.01)
(Continued)

(52) U.S. Cl.
CPC ............. *H02J 50/27* (2016.02); *H01Q 1/248* (2013.01); *H01Q 1/38* (2013.01); *H01Q 7/005* (2013.01);
(Continued)

(58) Field of Classification Search
CPC ........ B60L 11/00; B60L 11/182; H01F 38/00; H01F 38/14; H01Q 1/00; H01Q 1/248;
(Continued)

(56) References Cited

U.S. PATENT DOCUMENTS 5,625,371 A    4/1997 Miller
6,057,803 A    5/2000 Kane et al.
(Continued)

FOREIGN PATENT DOCUMENTS

CN    2569356 Y    8/2003
CN    103390797 A    11/2013
(Continued)

OTHER PUBLICATIONS

International Search Report and Written Opinion dated Jan. 22, 2018 for corresponding International Application No. PCT/GB2017/052446.
(Continued)

*Primary Examiner* — Lincoln D Donovan
*Assistant Examiner* — Dave Mattison
(74) *Attorney, Agent, or Firm* — Tarolli, Sundheim, Covell & Tummino LLP (57) ABSTRACT

An RF energy harvesting apparatus comprising an energy harvesting antenna carried on a substrate for fixing the antenna to an electrical device, wherein the antenna comprises a coil of conductive material carried on the substrate, wherein the coil provides two loops of conductive material on the substrate, the coil comprising a second loop inside a first loop; and wherein the coil comprises at least one
(Continued)

segment arranged to reduce spatial variations in the H-field in an area circumscribed by the first loop.

19 Claims, 5 Drawing Sheets

(51) Int. Cl.
| H01Q 1/38 | (2006.01) |
|---|---|
| H01Q 7/00 | (2006.01) |
| H04B 5/00 | (2006.01) |
| H01Q 1/24 | (2006.01) |
| H02J 7/02 | (2016.01) |
| H01Q 9/26 | (2006.01) |

(52) U.S. Cl.
CPC ............ H02J 50/10 (2016.02); H04B 5/0037 (2013.01); H04B 5/0081 (2013.01); H01Q 9/265 (2013.01); H02J 7/025 (2013.01)

(58) Field of Classification Search
CPC .......... H01Q 1/38; H01Q 21/00; H01Q 21/30; H01Q 5/00; H01Q 5/321; H01Q 7/00; H01Q 7/005; H01Q 9/00; H01Q 9/265; H01Q 9/27; H02J 17/00; H02J 5/00; H02J 5/005; H02J 50/00; H02J 50/10; H02J 50/27; H02J 7/00; H02J 7/025; H04B 5/00; H04B 5/0037; H04B 5/0081
USPC ........................................................ 307/104
See application file for complete search history.

(56) References Cited

U.S. PATENT DOCUMENTS

| 6,522,308 | B1 | 2/2003 | Mathieu |
|---|---|---|---|
| 2004/0135726 | A1 | 7/2004 | Shamir |
| 2006/0208957 | A1 | 9/2006 | Ilzuka |
| 2008/0048867 | A1 | 2/2008 | Oliver |
| 2008/0158092 | A1 | 7/2008 | Yakubo |
| 2009/0179812 | A1 | 7/2009 | Nakamura |
| 2012/0056790 | A1 | 3/2012 | Lee |
| 2012/0262003 | A1 | 10/2012 | Tetu |
| 2014/0339308 | A1 | 11/2014 | Endou |
| 2015/0130481 | A1 | 5/2015 | Debray |
| 2016/0181868 | A1* | 6/2016 | Casse ................. H01Q 1/248 307/104 |
| 2016/0181873 | A1* | 6/2016 | Mitcheson ............ H01Q 1/248 307/104 |

FOREIGN PATENT DOCUMENTS

| CN | 105356627 A | 2/2016 |
|---|---|---|
| GB | 0490383 A | 8/1938 |
| GB | 2517907 A | 3/2015 |
| JP | H10651044 A | 2/1994 |
| WO | 2007084510 A1 | 7/2007 |
| WO | 2008083719 A1 | 7/2008 |
| WO | 2008094383 A1 | 8/2008 |
| WO | 2011015511 A1 | 2/2011 |

OTHER PUBLICATIONS

GB Search Report dated Feb. 13, 2017 for corresponding GB Application No. 1700661.0.
GB Examination Report dated Jun. 19, 2017 for corresponding GB Application No. 1614088.1.
GB Examination Report dated Feb. 7, 2017 for corresponding GB Application No. 1614088.1.
GB Examination Report dated Feb. 8, 2018 for corresponding GB Application No. 1700661.0.
GB Examination Report dated Feb. 21, 2018 for corresponding GB Application No. 1614088.1.
GB Search Report dated Sep. 6, 2016 for corresponding GB Application No. 1614088.1.
GB Examination Report dated May 24, 2018 for corresponding GB Application No. 1700661.0.
GB Examination Report dated Jan. 8, 2019 for corresponding GB Application No. 1700661.0.

* cited by examiner

Figure 1

Inset A

APPARATUS AND METHOD FOR RF ENERGY HARVESTING

FIELD OF INVENTION

The present disclosure relates to methods and apparatus for harvesting energy from stray electromagnetic fields which may be emitted from electrical and electronic devices. The present disclosure also provides antenna designed to harvest power from such fields, it also provides methods of designing such antennae.

TECHNICAL BACKGROUND

Wireless power transfer systems are used to transmit power between electrical devices using time varying electromagnetic fields.

It is possible to transfer electrical power using alternating electrical field (E-field) and/or alternating magnetic field (H-field). Some wireless power transfer systems operate using so-called near-field coupling. Others may use far-field coupling.

Typically, H-field power transfer, also known as inductive power transfer may be more effective in the near-field, whereas in the far-field E-field effects may be more useful.

Wireless battery chargers and near-field RF communications devices both use inductive coupling to transfer power via an alternating H-field.

Wireless battery chargers are in widespread use. Such chargers may include coils which can couple inductively with a similar coil carried by a device which is to be charged. In these kinds of systems, the transmitting and receiving coils can be placed in very close proximity to each other.

Near-field RF communications devices such as RFID and NFC devices are perhaps the most common type of wireless power transfer devices. The operating frequency of near field RF communications is around 13.56 MHz. The corresponding wavelength is about 22 meters. Accordingly, a half-wave dipole antenna would need to be about 11 meters in length if it were to radiate well. Generally, due to the circumstances in which they are most often used, NFC antenna area may be limited to about 7 cm×2.5 cm. The maximum linear dimension is thus about 0.5% of a wavelength—a consequence of this is that the radiation efficiency of an NFC antenna is generally very, very low. Generally therefore, the object of NFC antenna design is to occupy as large a volume as possible. Generally simple coils with multiple turns are used, and the frequency response of such inductors needs only to be specified very loosely. It barely needs to be considered at all.

Telecommunications antenna design on the other hand is a complex technical field which involves a variety of considerations. Telecommunications devices such as cellular telephone handsets, Wi-Fi® access points and routers, and telecommunications network nodes such as base stations may provide relatively high energy emissions. These emissions can be used to mediate data signals over relatively long distances, and typically rely on far-field, as opposed to near-field, effects.

For wireless devices in general, and cellular telecommunications devices in particular, there is a general desire to increase communications range and to reduce energy losses in the environment immediately surrounding a wireless device. For example, cellular telephone handsets may be arranged to direct electromagnetic energy away from the body of a human user. This may assist in transmitting greater signal energy over greater distances.

Despite this general prejudice in the art, aspects and embodiments of the present disclosure may aim to improve energy efficiency by harvesting stray power associated with transmissions from wireless telecommunications devices, and also from other types of electrical and electronic apparatus.

SUMMARY OF INVENTION

Aspects and embodiments of the present disclosure are set out in the appended claims.

One aspect of the disclosure provides a dual loop antenna for fixing to an electrical device to harvest power from the electrical device. Such a dual loop antenna may comprise two concentric loops of conductive material both arranged, electrically in parallel, between a common differential signal connection for connecting both loops to a power harvesting apparatus.

Further aspects and embodiments of the disclosure are set out herein. Some of these embodiments will now be described in detail, by way of example only, with reference to the accompanying drawings, in which:

In the drawings like reference numerals are used to indicate like elements.

Figure 1:
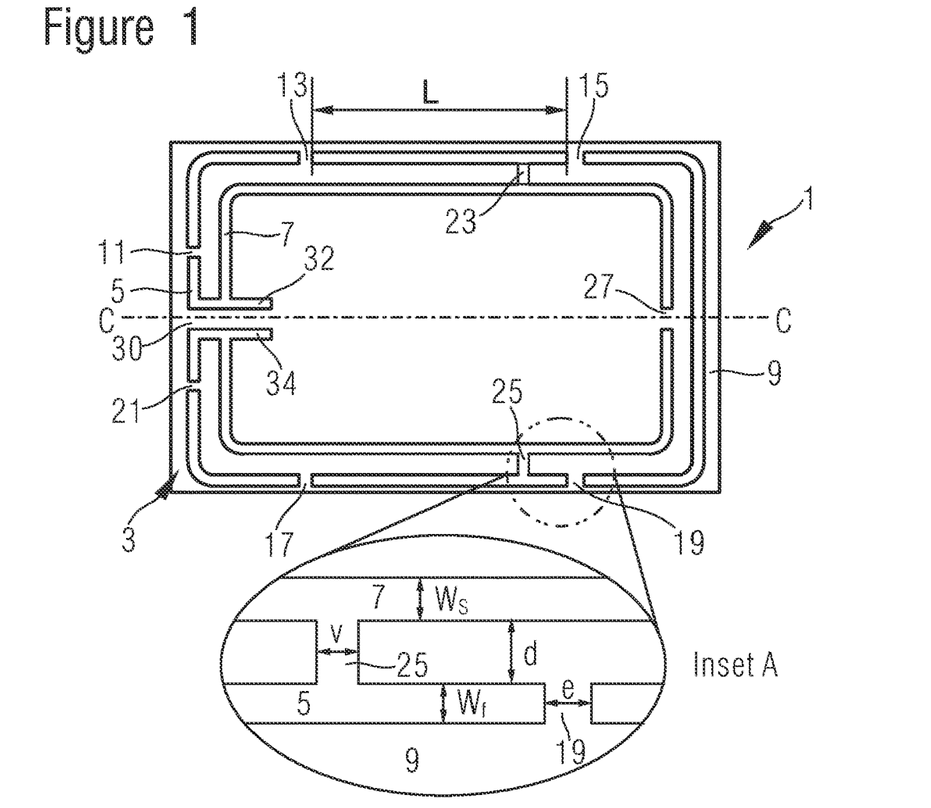
FIG. 1 shows a plan view of an antenna carried on a substrate.

FIG. 1 illustrates an apparatus 1 comprising an antenna 3 for RF energy harvesting, and a substrate 9 for carrying the antenna 3. The substrate 9 may also enable the antenna 3 to be fixed to, or integrated with, an electrical device—for example the substrate 9 may provide part of the housing of such a device.

The antenna 3 comprises two concentric loops 5, 7 carried on the substrate 9. The loops are each provided by tracks of conductive material. These tracks may be laminar in form, and laid flat on the substrate 9. The first of the two loops, the larger one, is discontinuous, but the tracks of each loop trace out the general shape of the loops across the substrate 9. Typically these loops are non-circular. For example, the loops may be rounded-rectangles as illustrated in FIG. 1.

The first loop 5 circumscribes the other loop on the substrate 9. The two loops of the antenna 3 may be spaced apart on the substrate 9 by a distance, d, which is greater than the width of the tracks which make up the loop (typically less than 20 times that width, generally less than 10 times). As noted above, the first loop 5 is discontinuous in that gaps 11, 13, 15, 17, 19, 21 are provided between adjacent lengths of the track which make it up.

These gaps 11, 13, 15, 17, 19, 21 provide some capacitive impedance in that loop and may contribute to its response to signals of different frequencies. In addition, to assist in choosing the frequency response of this loop of the antenna 3, at least one of the continuous lengths of track (e.g. a length unbroken by gaps) in the first loop 5 have a length, 1, which is selected based on a quarter wavelength, λ/4, of a preferred frequency band of the antenna 3. It can be seen in the example illustrated in FIG. 1 that the first (outer) loop includes two gaps 13, 15, 17, 19 in the track along each of its two longest edges. Accordingly, on each opposing edge of the first loop 5, a straight length of uninterrupted conductive track of length 1 lies between two adjacent gaps in the track.

As illustrated in FIG. 1, a plurality of bridges 23, 25 may be provided between the first loop 5 and the second loop 7. Each such bridge comprises a track of conductive material, e.g. like those tracks which make up the loops. This track spans the gap between the first (outer) loop and the second (inner) loop. The bridges 23, 25 may be perpendicular to the two loops, and are laid flat against the substrate 9—for example they may be coplanar with the two loops.

The positions of these bridges 23, 25 can be chosen to vary the effective continuous length of conductive track. For example, in the version of the antenna 3 shown in FIG. 1, a first bridge is arranged between the first loop 5 and the second loop 7 at a position along one of the two long edges of the antenna 3. A second bridge is also arranged in the same position along the opposite long edge of the antenna 3. It will thus be seen that the positions of these bridges 23, 25 may be selected so that they are symmetric about a centre line C-C of the antenna 3 which bisects its two shortest edges.

Both of the two loops may each comprise a signal coupling break. The position of this signal coupling break is the same in both loops. The signal coupling break may be provided in one of the two shortest edges of each loop and may be centred on the same centre line C-C of the antenna 3 (and perhaps also symmetric about that centre line C-C). At the two edges of this break the two loops may be joined together by two conductive legs 32, 34, one at each edge of the break. These conductive legs 32, 34 may each comprise a short length of the conductive track perpendicular to the tracks which make up the two loops either side of the break.

The conductive legs 32, 34 may be directed inward, toward the inside of the loops where they may terminate with a land, terminal or other connection. This break, and the two conductive legs 32, 34, may thus provide an electrical coupling for enabling a differential signal to be obtained from the two loops (e.g. using the voltage across the break between the two conductive legs 32, 34, with the two loops in parallel therebetween). This differential signal can be provided to a power harvesting apparatus disposed on the substrate 9 inside the second loop 7. This may be done by coupling such a power harvesting apparatus to the conductive leg at each side of the break.

The second (inner) loop may also include one or more gaps. For example, as shown in FIG. 1, the second loop 7 may include a gap in its shortest edge, opposite to the edge which includes the signal coupling break. This gap may be provided at the midpoint of that edge. Outside that edge, that same edge of the first loop 5 (e.g. the short edge, opposite the signal coupling break) may be provided by a continuous length of the conductive track. This can provide an inductive and/or DC conductive bypass path for current around the adjacent gap in the second loop 7.

The tracks which provide the two loops each have a selected width (extent across the substrate 9). In Inset A of FIG. 1, the width of the track which makes up the first loop is denoted $w_f$. The width of the track which makes up the second loop is denoted $w_s$. The tracks which make up these loops may also have a selected thickness (extent normal to the plane of the substrate 9). Depending on their thickness, and perhaps the depth to which they might extend into the substrate 9 these tracks may at least partially stand proud from the surface of the substrate 9. The tracks may be deposited on to the substrate 9, for example by a subtractive technique, e.g. by providing a layer of the conductive material on to the substrate and then selectively etching it away to create the tracks. Alternatively the tracks could be laid down by an additive technique, for example by deposition of the conductive material in a pattern that provides the conductive tracks. However they are provided onto the substrate 9, typically the tracks conform to the surface of the substrate 9 and are mechanically supported by it.

The width $w_f$ of the track of the first loop 5 may be different from the width $w_s$ of the track of the second loop 7. Likewise, the bridges 23, 25 between the first loop 5 and the second loop 7 may have a particular width (denoted v in Inset A of FIG. 1) and/or thickness, which may be chosen, as described below, in the process of selecting the response characteristics of the antenna 3.

The thickness of either or both of the tracks may be even around the loops so the top surface of the tracks is flat, or at least follows the shape of the underlying substrate 9. The widths $w_f$, $w_s$ of the tracks may also be even (e.g. the same width of track all the way round the loop). It will be appreciated in the context of the present disclosure that by varying the width and/or thickness of the tracks their impedance can be adjusted. Such variations may be applied to the loop(s) as a whole, and/or to some selected parts of the loop(s).

In particular, to provide an antenna 3 with a desired response characteristic, any selection of one or more of the following parameters (related to the physical arrangement of the antenna) may be adjusted until the response characteristic of the antenna 3 meets a particular criterion (or group of criteria). These parameters may include:
  the area circumscribed by the first loop 5;
  the area circumscribed by the second loop 7;
  the length of the track which makes up the first loop 5;
  the length of the track which makes up the second loop 7;
  the width of the track which makes up the first loop 5 and/or the second loop 7;
  the thickness of the track which makes up the first loop 5 and/or the second loop 7;
  the spacing between gaps in the track which makes up the first loop 5 and/or the second loop 7;
  the size of the gaps in the track which makes up the first loop 5 and/or the second loop 7;
  the positions of those gaps around the loop(s); and,
  the positions of the bridges 23, 25 between the first loop 5 and the second loop 7.

One of the advantages of this apparently simple structure is that it provides a number of parameters each of which can be selected to choose response characteristics of the antenna 3—such response characteristics may include its frequency response, its inductive coupling characteristics, and its response to time varying E-fields.

It will be appreciated that the physical arrangement of the antenna also includes parameters of the substrate—for example parameters such as its relative permittivity, its loss tangent at the frequencies of the antenna and/or its thickness. As explained herein these parameters too may be selected based on the response characteristic of the antenna—for example they too may be adjusted until the response characteristic of the antenna meets any one or more of the criteria described herein.

As just one example, the area circumscribed by a loop antenna 3 may have a significant bearing on the main resonant frequency of that loop—for example the main preferred frequency of such a loop antenna 3 may be dependent upon this area. Accordingly, it will be appreciated that a dual loop antenna 3 such as that illustrated in FIG. 1 may have two main resonant frequencies (and so two main preferred frequencies). However, it will be appreciated that the mutual coupling of the two loops may shift the frequency characteristic of one or both loops. The degree of coupling may be controlled by the spacing between the two loops—and this spacing may also have an influence on the harmonic modes which are present when the loop(s) are excited into resonance. However, to control the spacing between the two loops, in the apparatus of the present disclosure, it may be possible also to adjust the width of the tracks of one or both of the two loops. In some cases however, such adjustment may have an undesirable effect on one or more aspects of the antenna 3 response, but it may be possible to at least partially mitigate this by variation of the thickness, or some other parameter of those same tracks.

Likewise, some capacitive impedance can be introduced into the loops using the gaps. This may modify the capacitive impedance of the loops. This may be further modified by varying the size of those gaps.

The positioning of the gaps may also have an impact on the length of uninterrupted conductive tracks provided by the loops. This too may vary the reactive impedance of the loops, e.g. by providing a greater or lesser degree of inductance. In addition, by placing gaps at positions which would otherwise coincide with maxima of particular harmonic modes of oscillation, those modes may be at least partially suppressed.

If the positioning of a particular gap is needed to suppress a particularly undesirable harmonic mode, or if the uninterrupted length of conductive track in one of the loops might be undesirably foreshortened/extended by placing a gap at a particular position, it may be possible to mitigate this effect at least to some degree by providing a bridge, or bridges, between the two loops. This can enable one loop to provide an Ohmic (e.g. DC conductive) conduction path which bypasses that gap.

In addition to all of these effects, the properties of the substrate 9 may be used to provide yet a further degree of freedom. For example, the guided wavelength, $\lambda_g$, of an electromagnetic wave in a transmission line carried on a dielectric substrate 9 differs from the wavelength of the same signal in air, $\lambda_0$ according to the following formula:

$$\lambda_g = \frac{\lambda_0}{\sqrt{\varepsilon_{eff}}}$$

Where $\varepsilon_{eff}$ is the effective dielectric constant of the transmission line, which, for sake of simplicity, is taken to be the relative permittivity of the substrate 9 material. It will be appreciated in the context of the present disclosure however that the thickness of the substrate 9 and the width of the conductive track may also have some bearing on the effective dielectric constant.

The features of the structure set out above are significant because they each provide a degree of freedom which can be used to adjust the response of the antenna 3 as a whole. In addition, these parameters can be reliably and accurately adjusted by processes which are simple and easily repeatable. This may assist mass manufacture by enabling antennae with a wide range of different characteristics to be produced by the same manufacturing tooling. Because of the simplicity of the mechanical construction, and the fine degree of control which can be exercised over parameters such as track width, loop size, gap size, gap positioning etc. High precision control of the antenna characteristics may be provided simply.

The effects of some of the parameters may not be wholly independent from one another. This may be useful because, changing one parameter to move the response characteristic of the antenna 3 toward some desired result may also have other undesired consequences. It may however be possible to mitigate (e.g. to reduce) these undesired consequences to some degree by changing other parameters of the antenna structure to move towards a more desirable behaviour in this respect.

For example, the antenna 3 may be designed to reduce spatial variations in H-field in the area surrounded by the second loop 7—for example to provide homogeneous or nearly homogeneous H-field distribution in an area circumscribed by the first loop 5 and/or the second loop 7. It will be appreciated in the context of the present disclosure that this may be done primarily using the through plane component of the H-field $H_z$. In some embodiments the in-plane components, Hx and Hy, parallel to the plane of the antenna may also be taken into account. Adjustments may also be made to antenna design so as to provide a selected spatial distribution of E-field in the area surrounded by the second loop 7. For example, the antenna 3 may be designed to provide large magnitude and homogeneous in-plane E-fields.

Accordingly, the parameters set out in the bulleted list above (related to the physical arrangement of the antenna) may be chosen so as to reduce inhomogeneity in through-plane H-field and/or to reduce inhomogeneity in the magnitude of in-plane E-field. This may be done whilst mitigating adverse effects on other aspects of the response characteristic by adjusting others of those parameters. This may be done by numerical optimisation, for example using a merit function. In such a merit function the H-field features may be given a greater weighting than the E-filed features. Both fields however may be taken into account.

To design an antenna 3 such as that illustrated in FIG. 1, the size of the first loop 5 may be selected to fix the resonant frequency of that first loop 5 so that it coincides with a first preferred frequency band such as 880 MHz to 1950 MHz. For example the size of the loop may be chosen so that the total length traced out by the conductive track around the loop (e.g. the perimeter of the area encompassed by the loop) corresponds to the wavelength $\lambda_g$ in this frequency band. To increase the effective area of the antenna 3 (e.g. the area from which it can effectively harvest power, for example in the near field), the circumference of the loops may be made larger than $\lambda_g$ but a plurality of gaps can be introduced around the loops to offset this effect.

The response characteristic of the first loop 5 may then be tested, for example by using a computer simulation (such as finite element analysis or other numerical simulation), or by building a prototype and investigating (e.g. using electrical and/or magnetic measurements) the response of the antenna 3. This may be done by measuring the response of the test system as a function of the frequency of an excitatory signal—e.g. a time varying H-field and/or a time varying E-field. The response may be measured using the Return Loss (or dissipation factor) or other measure of the quality factor of the antenna 3. In addition, or as an alternative, a Smith Chart may be used to match the reactive impedance of the antenna to that of a power harvesting circuit such as an RF—to DC converter (e.g. a rectifier) to which the antenna is to be coupled. The size of the loop can be adjusted based on these measurements/simulations to obtain the desired response in the first preferred frequency band.

A second loop 7 can then be added to the test system, inside the first loop 5 and having a size chosen based on a second preferred frequency band. For example, the second preferred frequency band may be 2.2 GHz to 2.6 GHz. This may include adding the signal coupling break and the conductive legs 32, 34 to the two loops. Again (whether in a prototype or simulation) the response of the antenna 3 to an excitatory signal can then be measured as a function of frequency. The width of the conductive tracks which make up the first loop 5 and/or the second loop 7 can be adjusted to adjust the response of the antenna 3. For example, this can enable the gap between the two antennae to be changed to adjust the degree of coupling between them. This can also enable fine adjustments in the antenna 3 response without unduly shifting the centre frequencies of the two loops of the antenna 3.

The frequency response of the antenna 3 may be chosen relatively loosely-provided that the Return Loss in the preferred frequency bands is acceptable. Once the two frequency bands have been set for the antenna 3, the parameters of the antenna 3 may be varied to select the spatial distribution of the H-field in the region circumscribed by the antenna 3. The spatial distribution of the magnetic field can be adjusted by choosing the positions of the breaks in the two loops. This may be done by controlling/modifying the spatial distribution of electrical current in the loops using the gaps. For example, a particular arrangement can be built as a prototype, and/or simulated, and the positions of the gaps can be varied to control the H-field distribution in the loop in the presence of an excitatory signal. This may be done to reduce the degree of spatial variation in the H-field across the area circumscribed by the loops. If this is to be done by simulation and optimisation, the degree of spatial variation can be measured using a metric of homogeneity such as the variance. In this procedure, a merit function based on this measure of inhomogeneity may be used to select the position of these gaps, and this merit function may be adapted to place lesser weight on regions which are closer to the middle of the antenna 3 than on regions which are nearer to the edge. As noted above, the length of conductive track between adjacent gaps in the first loop 5 may be about $\lambda_g/4$ where $\lambda_g$ is the wavelength of the first preferred frequency band.

It will be appreciated that, depending on the constraints which are favoured, this same design method may be used to provide a variety of structurally similar antennae. Each having different performance characteristics. For example, precise frequency tuning may be favoured over H-field homogeneity and this may give rise to a different structure than if broadband performance is required or if H-field homogeneity is less of an issue. In addition, if as may be the case in some implementations, there is a need to accommodate conductive electrical components on the substrate 9 within the area surrounded by the second loop 7, adjustments may be made to the antenna structure to accommodate these as described above.

Figure 2:
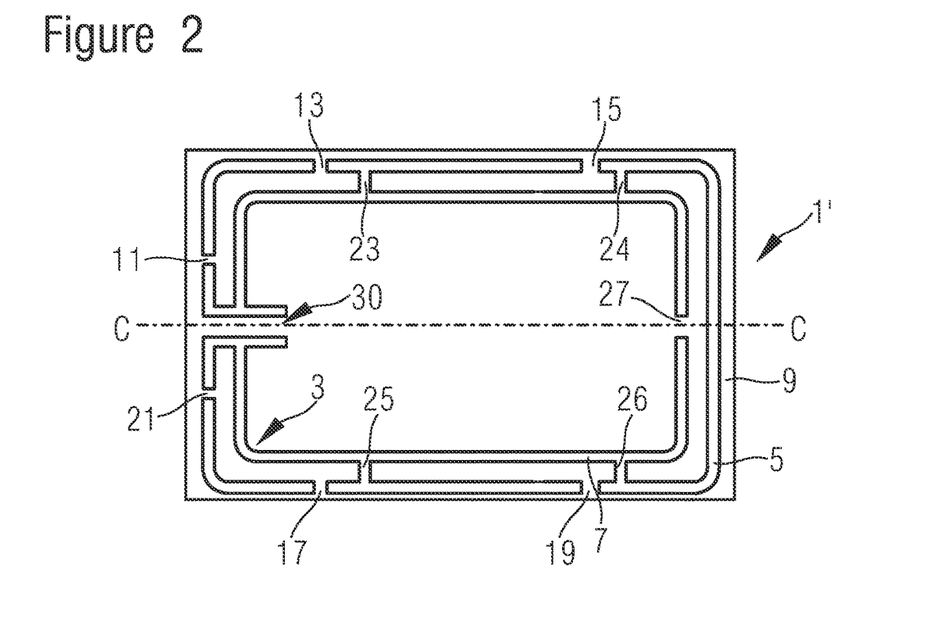
FIG. 2 shows a plan view of another antenna carried on a substrate.

FIG. 1 and FIG. 2 show two similar but structurally different antennae which arise from such treatments.

FIG. 2 shows an antenna in which the first loop 5 and the second loop 7 are both concentric rounded rectangles. The long sides of these rectangles are at least 10% longer, for example 20% longer than the short sides.

A signal coupling break 30 is disposed on one of the short sides of the antenna loops 5, 7. Two conductive legs 32, 34, one on each side of this break, link the first loop 5 to the second loop 7. The conductive legs 32, 34 extend into the area surrounded by the second loop 7 for coupling the antenna to an RF-to-DC converter of a power harvesting apparatus (e.g. to a rectifier).

The first loop 5 surrounds the second loop 7 and includes six gaps. The first gap 11 is spaced along the short edge of the first loop 5 by at least 10% of the length of that edge. The second gap 13 and the third gap 15 are spaced roughly evenly (e.g. symmetrically) about the midpoint of the long edge. The position of these three gaps 11, 13, 15, are mirrored by another three gaps 17, 19, 21, about the centre line C-C of the antenna which runs parallel with the long edges.

The second loop 7 includes a single gap. It is disposed in the short edge of the loop opposite to the signal coupling break. It may be centred on the centre line C-C of the antenna which runs parallel with the long edges. These two loops are separated by an even spacing around the second loop 7.

It will be appreciated that antennae of the present disclosure may have any one or more of the features described above with reference to FIG. 1 and/or FIG. 2.

Figure 3:
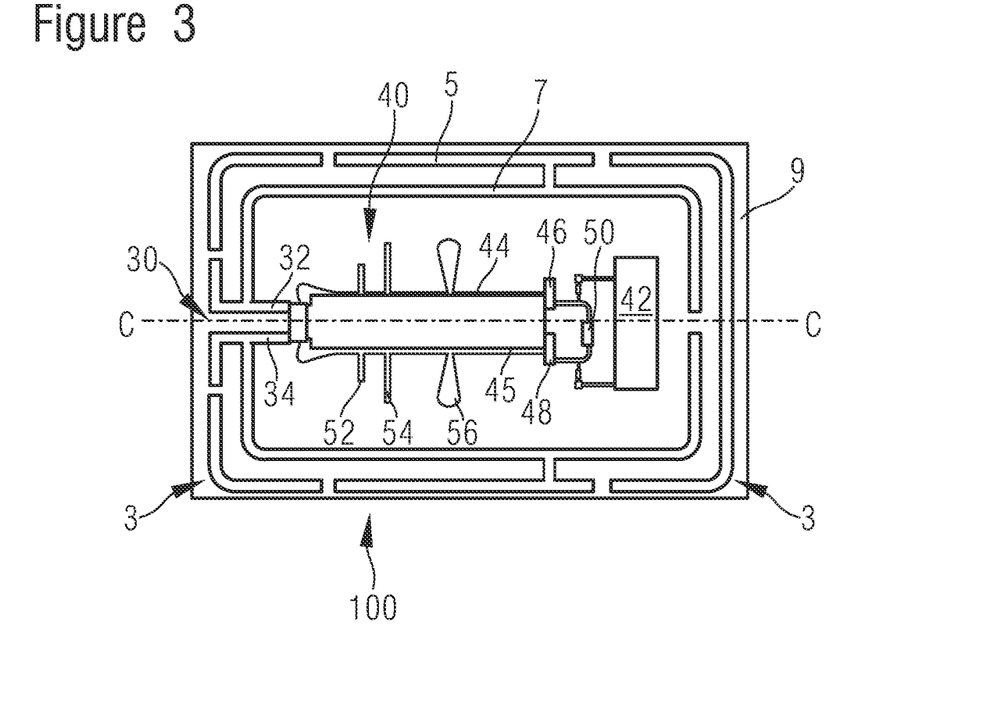
FIG. 3 shows a power harvesting apparatus.

Such antennae (and any other antennae described or claimed herein) may be used in power harvesting apparatus such as that illustrated in FIG. 3.

FIG. 3 illustrates a power harvesting apparatus 100 comprising a segmented (e.g. gapped) loop antenna 3 carried on a dielectric substrate 9, an RF-to-DC converter 40 also carried on that substrate 9 and surrounded by the loops 5, 7, and power conversion circuitry 42.

The RF-to-DC converter 40 may comprise a rectifier, such as a full wave rectifier, arranged to couple output of the loop antenna 3 to the power conversion circuitry 42. The rectifier illustrated in FIG. 3 is disposed on a region of the substrate 9 which is circumscribed (surrounded) by the second loop 7. The RF-to-DC converter 42 comprises two arms 44, 45, each made up by a micro-stripline of conductive track which links the output of the antenna loop 30 to a rectifying element 46, 48, as described below.

The output of both rectifying elements 46, 48, is coupled to a smoothing/energy store capacitor 50, and via a further track of electrically conductive material, to an input of the power conversion circuitry 42.

The power conversion circuitry 42 may comprise voltage and or current boost circuits such as Buck Boost circuits, and may be arranged to provide harvested DC power to an energy store such as a battery or capacitor (not shown). If the harvested voltage is high enough a boost may not be required. For example, in some embodiments a charge pump may be used instead of a boost.

As illustrated in FIG. 3, the two antenna loops 5, 7 can be concentric, but other constructions can also be used as explained below. They may also be symmetrical about a centre line C-C of the antenna 3.

The DC-to-RF converter 40 illustrated in FIG. 3 comprises a full wave rectifier. This rectifier is made up of two rectification arms 44, 45, each arranged electrically in parallel between the output 30 of the antenna loops 5, 7 and the input of the power conversion circuitry 42. The two rectification arms 44, 46 each comprise a track of conductive material which may be provided by the same type of conductive track which makes up the antenna loops 5, 7.

Each rectification arm 44, 45 also comprises a rectifying element 46, 48 arranged to provide a one-way conduction path along the arm 44, 45, so that the rectification arm only passes current in one direction. The one-way conduction path of one of the two arms may be arranged to pass current primarily in a first direction, whereas the other rectification arm may be arranged to pass current primarily in the opposite direction. Examples of rectifying elements include semiconductor devices such as diodes, for example a Schottky diode. Other examples include the parasitic or inherent diode provided by a transistor, or a gate-source coupled transistor.

The conductive track which makes up the rectifier arm may also include two filter stubs, 52, 54, each of which branches off at right angles to the main strip of the arm 44, 45—the strip which links the output of the antenna to the rectifying element. One of these two filter stubs 52 may have a length selected based on the guided wavelength, $\lambda_g$ of a $2^{nd}$ order harmonic of a preferred frequency band of the antenna (for example it may have a length of $0.16\lambda_g$, for example between $0.155\lambda_g$ and $0.165\lambda_g$). The other of the two stubs may have a length selected based on the guided wavelength of a $3^{rd}$ order harmonic of the preferred frequency band (for example it may have a length of $0.11\lambda_g$, for example between $0.105\lambda_g$ and $0.115\lambda_g$). The rectifier arms 44, 45, may also comprise a sector shaped capacitive land 56 which may act as a low pass filter. Although the specific lengths set out above may be useful in some embodiments, other lengths may be used for example one of these two filter stubs 52 may have a length selected to provide a $\lambda_g/4$ filter stub for a $2^{nd}$ order harmonic of a preferred frequency band of the antenna. The other of the two stubs may have a length selected to provide a $\lambda_g/4$ filter stub for a $3^{rd}$ order harmonic of a preferred frequency band of the antenna.

The tracks which make up the rectifier arms 44, 45 may be arranged on the substrate 9 so that the conductive material of each arm is the mirror image of the material of the other arm as reflected in the centre line C-C which bisects the first loop 5 (parallel to its long edge). This material of course may include the filter stubs which may also be arranged in this mirror-image fashion so that the filter stubs of each arm are directed in opposite directions, for example they may be directed away from the other arm of the rectifier.

It can be seen in FIG. 3 that the arrangement of components between the rectifying elements and the power conversion circuitry may lack the symmetry of the rectifier. The power conversion circuitry, or at least any ground plane or large conductive lands which are part of that circuitry, may be centred on the centre line C-C of the antenna loops.

The antenna illustrated in the drawings comprises two loops, but in some embodiments a greater or lesser number of loops may be used. For example a third loop having a size selected based on a third preferred frequency band may be added to any of the two-loop antennae described or claimed herein. Fourth and further such loops may also be added. In some embodiments a single loop antenna is provided. The size of this loop may be selected as with the loops of other antennae described and/or claimed herein.

In such single loop embodiments the loop may comprise a series of gaps at positions selected to reduce spatial variations in a H-field distribution within the loop when the loop is excited with a time varying electromagnetic field, such as a time varying H-field in a preferred frequency band of that loop. Such a loop may be provided by conductive track disposed on a substrate 9 as described above. In addition, a full-wave rectifier may be carried on a region of the substrate 9 circumscribed by the loop. This rectifier may comprise a micro-stripline rectifier such as that described with reference to FIG. 3.

It may also comprise lumped components. In some such embodiments, the positions and/or sizes of the gaps in the antenna loop are selected to compensate for field inhomogeneity (e.g. H-field or E-field inhomogeneity) caused by the disposition of the rectifier within the loop. The positions of the gaps may be spatially symmetric about a centre line C-C of this single loop. The rectifier may also be spatially symmetric about this same centre line C-C—for example the layout of components of the positive going arm of the rectifier may be a mirror image of the layout of components of the negative going arm of the rectifier.

Where antennae of the present disclosure include multiple loops these may be concentric. The loops may also be the same shape as each other so that the spacing between the loops is even around most, or all, of the inner loop. In some embodiments the loops are of different shape, but still concentric in the sense that they share a common centre. For example, where the loops are rounded rectangular in form the ratio of the length of the long side to that of the short side may differ between the two loops—for example one may be closer to square in shape than the other so that the spacing between the loops is larger at the ends than along the long edges.

The loops may be carried by the substrate 9 in any appropriate manner, for example they may be disposed on its surface, where they may be fixed in place, for example by being bonded or adhered to the substrate 9. As another example, the loops may be embedded in the surface, for example they may be disposed in a groove in the surface or otherwise integrated with it.

The loops are each provided by tracks of conductive material. These tracks may be laminar in form, and laid flat on the substrate 9. The conductive track may be provided in the form of a 35 micron-thick copper layer formed on the substrate 9. Naturally, a metal or another conductive material other than copper may also be used instead. The thickness of the conductive trace may be varied. For example it may be at least 9 μm, for example at least 20 μm. In some of these possibilities (and others) it may be less than 70 μm, for example less than 60 μm.

In some embodiments the thickness of the substrate is selected to provide a particular guided wavelength $\lambda_g$. The substrate may comprise an electrical insulator such as a dielectric laminate material, which may comprise a thermoset plastic. Such a substrate may have a loss tangent of between 0.02 and 0.05 at the frequency bands of the antenna. These frequency bands may comprise the 2.4 GHz WiFi band (spanning 2.4 GHz to 2.495 GHz) and the 900 MHz GSM band. The substrate may have a loss tangent of between 0.003 and 0.004 at these frequencies, for example 0.0035. The substrate may have a relative permittivity of between 2.17 to 10.2, for example between 3 and 6, for example about 5, for example 4.8. The substrate may be rigid. For example it may have a Young's modulus of at least 1 GPa, for example at least 5 GPa, for example at least 10 GPa, for example less than 40 GPa, for example less than 25 GPa. The substrate may have a young's modulus of between 10 GPa and 30 GPa, for example between 20 GPa and 25 GPa. One example of such a material is FR-4 glass epoxy.

It will, of course, be appreciated that this example of a material is given by way of example only, and that other substrate materials (e.g. RO4003® produced by Rogers Corp.™, which has a relative permittivity of 3.55 and a loss tangent of 0.0027 at these frequencies, or a RO3000® series high-frequency laminate) may be used.

The substrate may be at least 100 μm thick, for example between 100 μm and 3 mm, for example between 0.125 mm and 1.52 mm. In an embodiment the substrate is rigid and is 0.75 mm thick.

In some embodiments the substrate may be flexible, for example it may have a young's modulus of less than 1 GPa. In some embodiments the substrate may be resilient, for example it may be configured so that the antenna tends to recover its shape after deformation.

The substrate 9 may be flat, or may be shaped according to the shape of the energy source from which it is intended to harvest power. For example, the substrate 9 can be shaped so as to form a part of the housing of an electronic device. For example, it may be shaped to provide a clip-on case for a device such as a cellular telephone or tablet computer.

Figure 4:
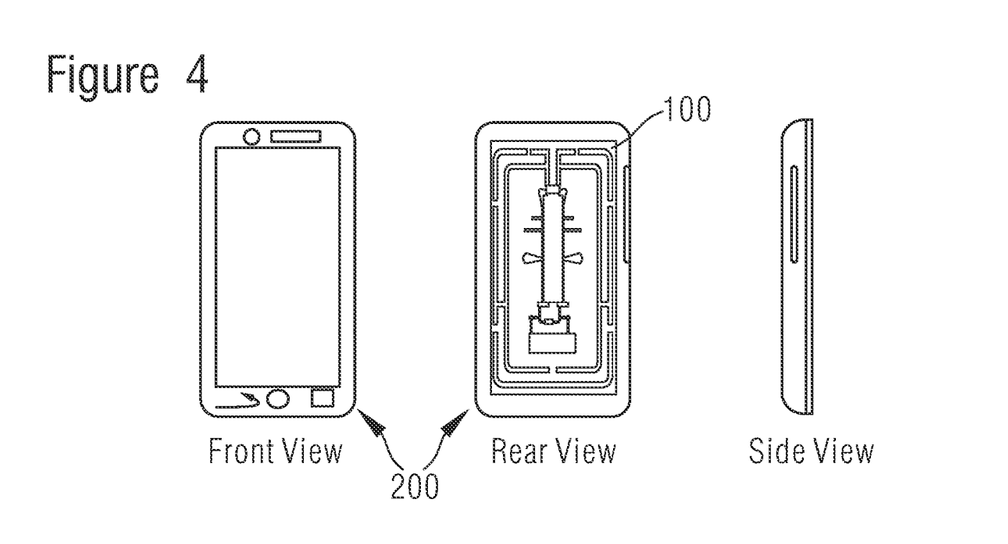
FIG. 4 shows an electronic device carrying a power harvesting apparatus

One such embodiment is illustrated in FIG. 4 which shows a cellular telephone handset 200 in which a power harvesting apparatus according to the invention is carried in the rear part of the case of the handset. It will be appreciated that the power harvesting apparatus may be partially or totally hidden from view in some implementations, but it is shown in the drawing as if it were visible.

In addition to mounting on telephone handsets, power harvesting apparatus of the present disclosure may be provided in, or as accessories to any of a wide variety of sources of RF energy. Some may be provided in heat resistant cases or in mechanically robust and/or water resistant cases to enable them to be integrated into machinery such as internal combustion engines.

The substrate 9 may be more rigid than the conductive track e.g. to provide mechanical support to the loops, but in some embodiments it may be flexible and/or resilient.

As illustrated in FIG. 4, the power harvesting apparatus of the present disclosure may be a similar size to the size of the device on which it is to be mounted. For example it may cover at least 50% of a surface of the device. However, differently sized apparatus may be used and the harvester does not need to be the same size as the source. In some embodiments the apparatus includes a plurality of antennas which can be distributed about a surface of a device which is to act as a source and/or can be placed near such a source. For example one antenna may be disposed on the top of the source and one on the bottom. The antennae can be tuned to different frequencies and connected together in series, in parallel, or in an array of parallel series connections.

In some examples an RF energy harvesting apparatus comprises an energy harvesting antenna carried on a substrate for fixing the antenna to an electrical device. The antenna comprises a coil of conductive material carried on the substrate forming an elongate track, wherein the coil comprises a terminal at each end thereof for coupling an input or output to the antenna. The elongate track of the coil has a substantially constant width along its length and is arranged in a spiral pattern substantially completing two complete revolutions to provide two loops of conductive material on the substrate, so that each loop has a respective terminal at an end thereof.

The two loops comprise a second loop inside a first loop and are formed from the same conductive material forming the length of the coil. The second loop has a smaller width and length than that of the first loop to fit inside the first loop, and the first loop and the second loop are coupled by a link extending from the first loop to the second loop, wherein the link is also formed from the same conductive material forming the coil and the two loops.

The coil comprises at least one segment at a location along the length of the coil that introduces at least one of an additional capacitive impedance and an additional reactive impedance into the coil, and the arrangement of the at least one segment is selected to adjust the impedance of the antenna, so that the elongate track of the coil comprises the two loops, the at least one segment, the link and the terminals at locations along the length of the coil.

Figure 5:
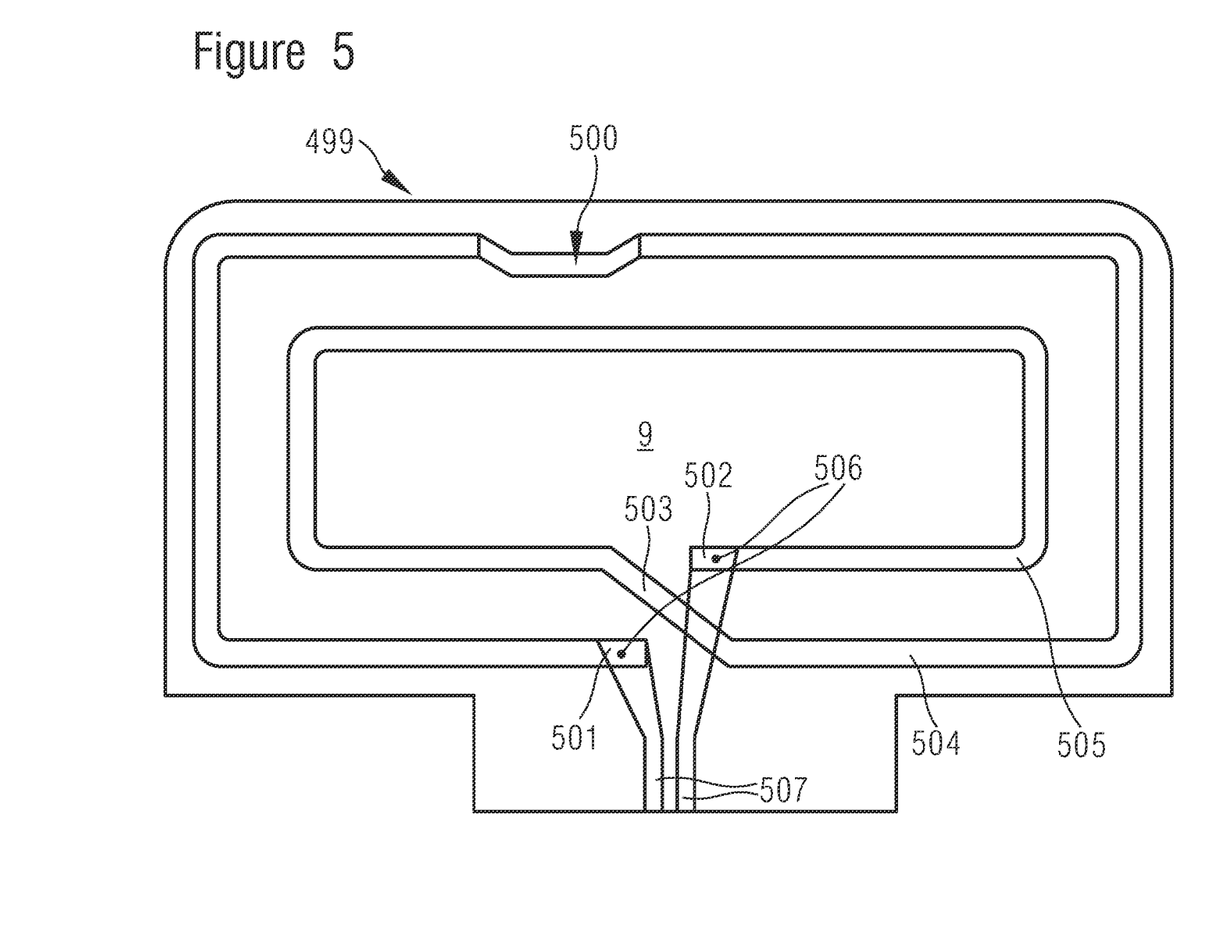
FIG. 5 shown a plan view of another example antenna carried on a substrate.

FIG. 5 shows an example antenna 499 for RF energy harvesting. The antenna 499 comprises an elongate track of conductive material that is carried on a substrate 9. The track is formed from a coil which comprises two loops, a first loop 504 and a second loop 505 wherein the second loop lies within the boundary of the first loop. In the example shown, the two loops are concentric forming an annulus therebetween.

One way to achieve this is by forming the conductive track, which may be a conductive material in laminar form, for example as a layer, which may be deposited onto the substrate to be formed in situ. The track may follow a spiral like pattern so that the second loop 505 falls within the first loop 504. Each loop may have a similar (for example the same) aspect ratio as the substrate 9 on which it is carried. The end of one loop is connected to the beginning of the next by a diagonal link 503 of the conductive track. For example, the link may lie at a non-perpendicular angle to the track of the two loops at the point it meets them. This diagonal link may thus extend from a first loop 504 to a smaller second loop 505, thereby forming the coil.

A segment of the conductive track in the first, outer, loop 504 forms a meander 500. The meander 500 may comprise at least two opposing bends in the pane of, or into the plane of, the substrate 9. In the present example, the meander 500 comprises two bends of opposing direction so that the meander 500 is offset towards the center of the antenna 499 while still maintaining a conductive connection to the rest of the loop. The meander 500 is located on the opposite side of the loops on the same face of the substrate 9. The coil also comprises two terminals 501 and 502, in this example on an opposite side of the same face of the substrate 9 to the meander 500. The terminals 501 and 502 are located at each end of the coil of the conductive track and, in this example, both terminals are located on the same side of the two loops, in the approximate centre of a longer side of the loops. The diagonal link between the first loop and the second loop lies between the terminals 501 and 502 of the antenna 499.

In the example of FIG. 5, the terminals 501 and 502 are connected, by pins 506 that travel through the substrate 9, to further conductive material on the other face of the substrate 507 to that of the coil. The conductive material on the other face of the substrate may couple the antenna to circuitry, such as an RF-to-DC converter.

In an example, the dimensions of the antenna 499 may be selected to meet certain design constraints, for example based on an intended use of the antenna. For example, the looped design of the antenna 499, for example as described above, may allows the miniaturisation of the antenna 499. This may be enabled as the use of loops increases the effective area of the antenna while maintaining the required absorption efficiency, making the antenna more suitable for use in situations where a small size is a favourable characteristic, such as in mobile devices.

The dimension of the loops can be chosen to fix a resonant frequency of the antenna 499 to a preferred frequency band. This could be for example 880 MHz to 1950 MHz in which case the total length of the coil may correspond to a wavelength, A, of (or a multiple of) this frequency band. Additionally, the link may allow for the entire length of both loops to be utilised in achieving this resonant absorption frequency selection.

The segment of the first loop 504 of the antenna 499 in FIG. 5 (in this example the meander) is displaced towards the center of the antenna 499 relative to a line of symmetry of the loops, while still providing a conductive path around the loop.

In an example the meander provides additional capacitive impedance in the first loop 504, and also affects the impedance of the second loop 505 as the change in separation of the first and second loops 504 and 505 causes additional capacitive impedance in the second loop 505.

As noted above, the terminals 501 and 502 of the illustrated antenna are coupled to conductive pins 506 that allow the antenna 499 to be connected to further RF energy harvesting apparatus such as a rectifier or frequency filtering components, to allow the absorbed RF energy to be converted to a DC current.

Figure 6:
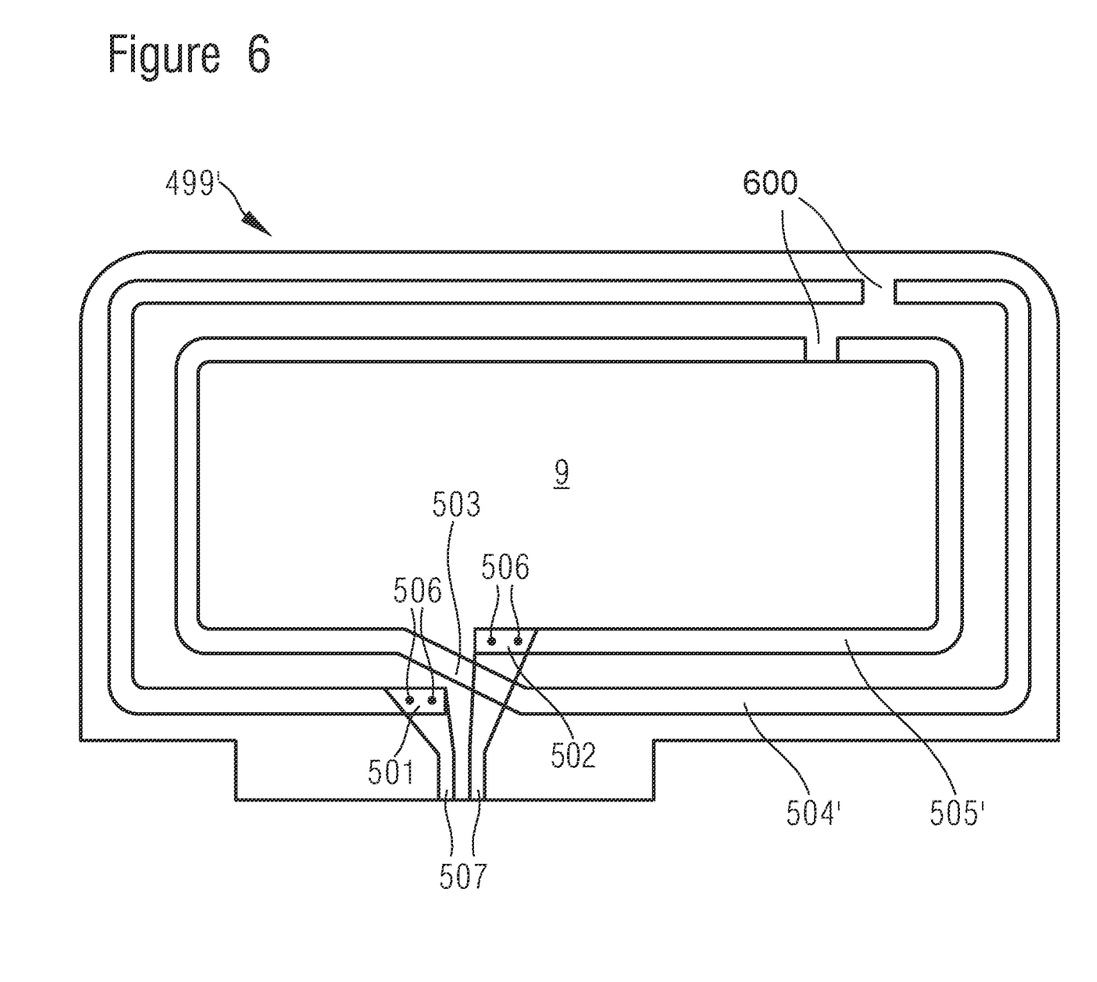
FIG. 6 shown a plan view of another example antenna carried on a substrate.

FIG. 6 shows another example antenna 499' for RF energy harvesting. This antenna shares some similarities with the antenna depicted in FIG. 5, such as the width of the conductive tracks and the size of the first loop 504', however there are some important differences.

In FIG. 6, the second loop 505', which lies within the first loop 504', is larger than that of FIG. 5, with a smaller separation between the two loops. The antenna 499' also comprises two terminals 501 and 502, disposed at each end of the coil and located on the same, longer side of the coil, noticeably off center relative to a line of symmetry of the loops.

The antenna 499' further comprises two segments, one in each loop, that are both located on the opposite side of the loops to the terminals 501, 502 on the same face of the substrate 9. In this example, the segments both comprise gaps 600 in the elongate track of conductive material. The gaps are small when compared to the dimensions of the antenna 499' in the plane of the antenna.

As in FIG. 5, the terminals 501 and 502 are connected, by pins 506 that travel through the substrate 9, to further conductive material on the other side of the substrate 507, for example to couple the antenna to an RF-to-DC converter.

In an example, the variation in size of the second loop 504' leads to a longer total length of coil which may cause the resonant frequency of the antenna 499' to be shifted. A further effect of the two loops having a smaller variation in size is that there is a stronger capacitive effect between the two loops, affecting the impedance of both loops, which in turn affects the response of the antenna 499'.

Segments of the conductive track, such as gaps or meanders (which are types of segment), may introduce capacitive impedance to the loops in which they are located. This changes the impedance of each loop, further affecting the response of the antenna 499'.

In the example shown in FIG. 6 the antenna comprises two gaps 600. The placement of these gaps 600 is chosen to reduce the variation of the H field within the second loop 505'. A notable difference between the meander in FIG. 5 and the gaps 600 of FIG. 6 is where the capacitive impedance is introduced; the meander 500 introduces impedance into both loops due to the change in separation between each loop whereas the gaps 600 may only introduce capacitive impedance to the loop in which they are located. In examples, this allows the specific tuning of the impedance of each loop, allowing fine control over the response of the antenna 499' and variation in H field inside the second loop 505'.

In some examples, while in a DC circuit the gaps 600 would act as an open circuit and therefore prevent DC currents from flowing across them, in an AC circuit, such as an antenna 499' that receives high frequency RF radiation, these gaps 600 may act as capacitors and therefore do not prevent the flow of the induced AC current.

Figure 7:
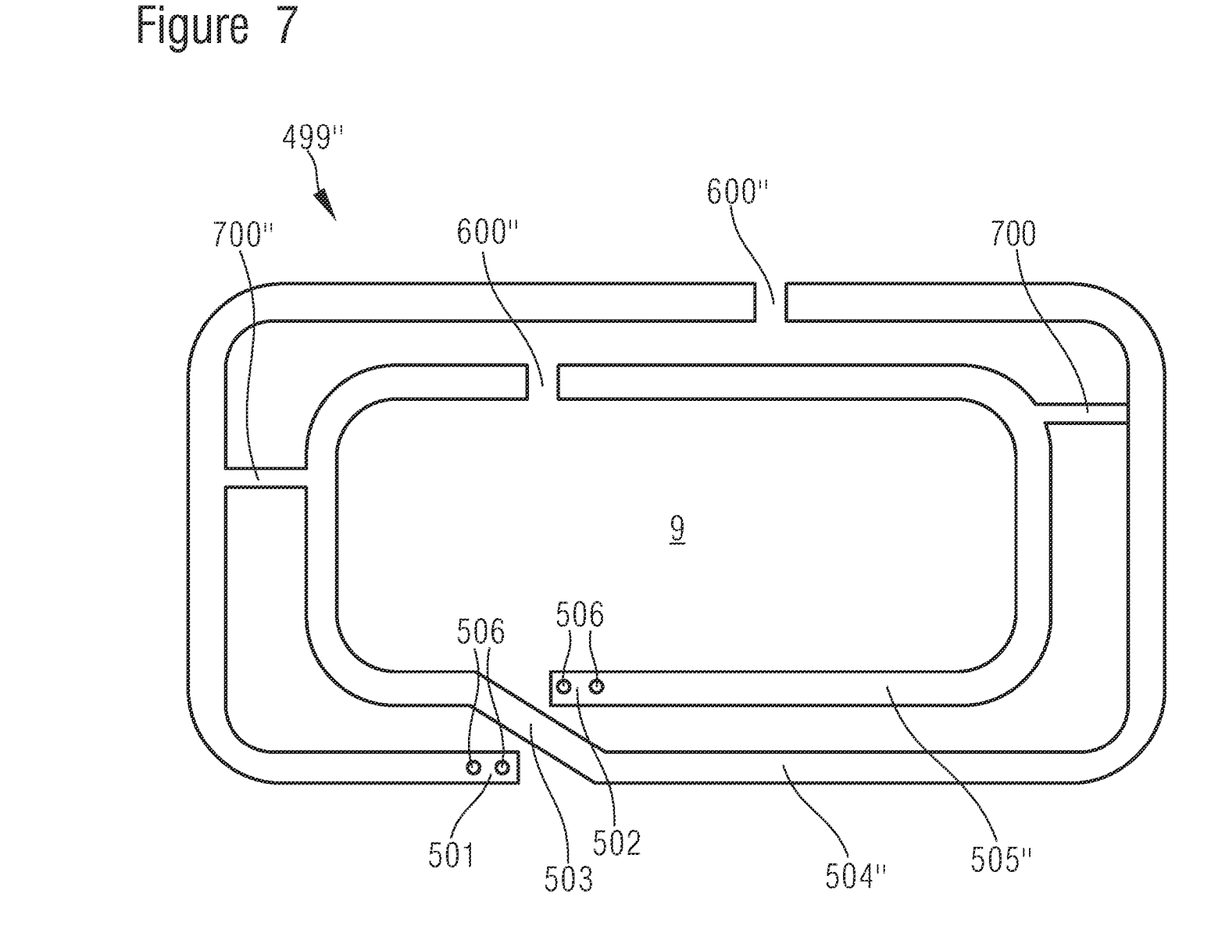
FIG. 7 shown a plan view of another example antenna carried on a substrate.

FIG. 7 shows a third example antenna 499" for use in an RF energy harvesting apparatus. The antenna 499" includes two loops, with the second loop 505" disposed within the first loop 504", comprising an elongate track of conductive material carried on a substrate 9.

This antenna 499" comprises all the features of the antenna 499' of FIG. 6 with the addition of bridges 700. As before, the segments, which in this case are gaps 600", lie on the opposite side of the loops to the terminals 501 and 502 on the same face of the substrate 9 and are distributed so that each respective loop has a corresponding gap. The bridges 700 provide additional conductive paths between the first and second loops. They consist of conductive material and provide a shortened conductive path between the terminals 501 and 502 of the antenna, which are located at each end of the coil. The bridges 700 connect the shorter sides of the loops in the shortest way possible.

The bridges 700 act to provide additional conductive paths between the ends of the coil. In examples, this change in conductive path length allows the antenna 499" to be tuned to a preferred frequency band by changing the effective conductive path. For example, as previously mentioned, this could be tuned to $\lambda$ or $\lambda/4$ of the desired RF radiation.

Many parameters of these energy harvesting antennas can be adjusted to optimise their performance. For example, the properties of the substrate impart properties to the antenna and its applications. The inventors have found that a thin substrate enables the antenna to be flexible, allowing it to be placed on curved surfaces. Furthermore, a thin substrate allows for a more compact antenna and when this design feature is combined with the selection of the remaining two dimensions of the substrate, the antenna can be designed to fit onto existing devices or structures, such as mobile phones. The dimensions of the substrate can also be chosen to include space for additional energy harvesting apparatus such as a rectifier. This design choice can also allow the antenna, rectifier and other electronic circuitry, such as an energy store, processor and/or user operable interface to be to be combined onto one substrate which could be attached to an existing device or structure.

As previously mentioned, the size of the loops can also be used to tune the performance of the antenna. The main effect when changing the size of the loops is changing the length of the conductive track that the coil is comprised from. This can affect the central frequency in the absorption response of the antenna, allowing it to be selected based on a preferred frequency region, such as that of radio communications. This also ties in with the separation of the two loops that comprise the coil. The separation of these loops affects their capacitive impedances. In many uses of this energy harvesting antenna, the antenna will be attached to further apparatus used to filter and convert the received RF energy into a more useful DC current. In the case where it is attached to a rectifier, it may be desired to match the impedance of the antenna to that of the rectifier to prevent energy loses. This can be achieved by adjusting the dimensions of the loops, and therefore their separation, as well as adjusting other properties of the antenna such as the use and placement of segments (such as gaps and meanders) and bridges.

The width of the elongate track of conductive material can also be selected to alter the impedance of the antenna. For example, the width of the elongate track of conductive material may be selected to match the impedance of a connected rectifier.

In the examples presented above, the loops have a substantively rectangular shape, with rounded corners. While this is the embodiment which has been chosen to displayed, it is possible to create antenna comprising loops of a different shape, such as circular or square and vary the degree of roundness to which the corners conform. The same tuning, by selection of segments to minimise variation of the H field within the second, inner loop and select the impedance of the antenna can be applied to similar effect as described above.

The depth of track, defined as the dimension of the conductive track out of the page when referring to FIGS. 1, 2, 3, 5, 6 and 7, is substantially constant around the coil and may be selected to maximise the efficiency of the antenna.

The segments that can be located around the loops can be of different types, including meanders and gaps or any other structure that introduces selected capacitive and/or reactive impedance at a preferred frequency or minimises the spatial variation in the H field within the area circumscribed by the first loop and/or the second loop. The function of these segments may be to introduce additional impedance (such as a capacitive impedance) into the antenna, for example to improve the response of the antenna at a preferred frequency (such as 900 MHz). For example, a segment or segments may minimise the variation in the H field within the area circumscribed by the first loop, without extending the length of the coil and/or without altering the tuning of the central frequency of the antenna. Segments, for example either one on the first loop or at least one on each loop, may often be located on the opposite side of the loops from the terminals, for example as shown in FIGS. 5, 6 and 7.

A meander consists of a segment of the elongate track of conductive material that has impedance per unit length different to that of the rest of the coil per unit length at a preferred frequency band. In FIG. 5, this is achieved by displacing a length of the conductive track towards the centre of the antenna, leading to the segment having increased impedance per unit length when compared to the impedance per length of the rest of the coil. This allows a meander to be defined as a segment of the coil that has two opposing bends, leading to different impedance per unit length for the conductive material located between these opposing bends. The direction of this displacement is shown as an example and in other antenna it may be displaced away from the centre of the antennas to reduce the capacitive impedance of the antenna by increasing the separation of the loops for the length of the segment.

The placement of these segment(s) may be selected to tune the impedance of the antenna and also minimise the variation of the H field within the second loop. In an antenna, a single segment may be located on the first loop; in other antenna each loop may have at least one segment. In this latter case, the segments on each of the loops may be located on the same side of the loops.

Gaps can be segments of the coil in which there is no conductive material. This may provide impedance in the antenna while also reducing the spatial variation in the H field within the area circumscribed by the second loop. The length of the segments when considered in the context of the gaps can be selected to tune the impedance that the gap provides.

Bridges can be included in the antenna to enable the lengths of conductive paths within the antenna to be altered. While some antenna do not include bridges at all, others include at least one bridge that provide connections between the first loop to the second loop, in addition to the link that causes the coil to be formed form the two loops. In a preferred antenna, the antenna comprises two bridges that are located on opposite sides of the loops to each other. These bridges may be perpendicular to the loops and therefore lie along the shortest path between the loops and the width of the conductive track of which the bridges are comprised can be adjusted to alter the impedance of the antenna.

The terminals of the antennas are located at the ends of the elongate track of conductive material that forms the coil. From the first terminal, the elongate track forms a substantial portion of a first loop, after which a second loop is substantially formed within the first loop. These loops are connected by a link of conductive track, preferably located between the two terminals. The coil can therefore be described as a first loop which completes one revolution at which point the elongate track passes inside the first loop, in a spiral like pattern. Once inside of the first loop, the second loop is then formed by a second revolution of the coil, ending in a position such that the link between the coils is located between the start of the first coil and the end of the second coil, enabling the link to be between the terminals.

In all of the example antennas in FIGS. 5, 6 and 7, conductive pins that pass through the substrate from each terminal are shown. These allow the antenna to be connected to additional energy harvesting apparatus such as rectifiers or frequency filtering components. The connections to this additional apparatus pass through the substrate to allow the connections to stay in the plane of the substrate.

It will be appreciated that RF energy harvesting of the disclosure may comprise an antenna having any of the features described herein. For example, it may comprise an antenna carried on a substrate for fixing the antenna to an electrical device. In an embodiment there is provided a method of designing an antenna for such an RF energy harvesting apparatus. The method may comprise selecting an arrangement of a first loop of conductive material on the substrate, selecting the arrangement of a second loop of conductive material on the substrate inside the first loop. Selecting this arrangement may comprise selecting the size of the first loop is selected based on a first preferred frequency band and selecting the size of the second loop based on a second preferred frequency band of the antenna. The antenna may also comprise a plurality of bridges of conductive material linking the first loop to the second loop, and the method may comprise selecting the arrangement of these bridges based on a response characteristic of the antenna such as those described above. Any one or more of the parameters set out in the bulleted list above (related to the physical arrangement of the antenna) may be selected based on this response characteristic. For example, the arrangement of at least one of (i) the gaps and (ii) the bridges may be selected to reduce spatial variations in H-field in the area surrounded by the second loop. These methods may be computer implemented, and the method may comprise providing a data output file which can be used for manufacture of such an antenna—for example to control a manufacturing process. These methods may further comprise manufacturing the antenna and/or the entire power harvesting apparatus.

The antenna may be manufactured by subtractive or additive processes as described above. It may also be manufactured by assembling pre-manufactured components together such as by adhering a conductive sheetlike element to the substrate 9. This may be done by laying down a preformed track of the conductive material, or by laying down a larger sheet and then etching it away. This sheetlike element may be grown or deposited as a layer on the substrate 9. If it is deposited a mask may be used so the deposition happens only on regions which are to carry the conductive track and/or it may be allowed to take place over a larger area and then selectively etched away. Other methods of manufacture may also be used. For example, the antenna may be manufactured by way of '3D printing' whereby a three-dimensional model of the antenna is supplied, in machine readable form, to a '3D printer' adapted to manufacture the antenna. This may be by additive means such as extrusion deposition, Electron Beam Freeform Fabrication (EBF), granular materials binding, lamination, photopolymerization, or stereolithography or a combination thereof. The machine readable model comprises a spatial map of the object to be printed, typically in the form of a Cartesian coordinate system defining the object's surfaces. This spatial map may comprise a computer file which may be provided in any one of a number of file conventions. One example of a file convention is a STL (STereoLithography) file which may be in the form of ASCII (American Standard Code for Information Interchange) or binary and specifies areas by way of triangulated surfaces with defined normals and vertices. An alternative file format is AMF (Additive Manufacturing File) which provides the facility to specify the material and texture of each surface as well as allowing for curved triangulated surfaces. The mapping of the antenna may then be converted into instructions to be executed by 3D printer according to the printing method being used. This may comprise splitting the model into slices (for example, each slice corresponding to an x-y plane, with successive layers building the z dimension) and encoding each slice into a series of instructions. The instructions sent to the 3D printer may comprise Numerical Control (NC) or Computer NC (CNC) instructions, preferably in the form of G-code (also called RS-274), which comprises a series of instructions regarding how the 3D printer should act. The instructions vary depending on the type of 3D printer being used, but in the example of a moving printhead the instructions include: how the printhead should move, when/where to deposit material, the type of material to be deposited, and the flow rate of the deposited material. In some embodiments the power harvesting antenna may be encapsulated in a flexible case, for example a polycarbonate case.

The tracks may be deposited or printed and other components, such as the rectifier mentioned above, may also be provided by the same process.

The antenna as described herein may be embodied in one such machine readable model, for example a machine readable map or instructions, for example to enable a physical representation of said antenna to be produced by 3D printing. This may be in the form of a software code mapping of the antenna and/or instructions to be supplied to a 3D printer (for example numerical code).

Aspects and embodiments of the present disclosure are set out in the appended claims, and further optional refinements are set out below.

One aspect provides an RF energy harvesting apparatus comprising an energy harvesting antenna carried on a substrate for fixing the antenna to an electrical device. This antenna may comprise: a coil comprising two consecutive turns of a spiral provided by a track of conductive material carried on the substrate to define a spiral path.

The turns of the spiral may be complete turns. The coil may thus provide two loops, a first loop provided by one of these consecutive turns of the spiral and a second loop provided by the other one of the consecutive turns. The second loop may be inside the first loop, e.g. it may be carried by an area of the substrate circumscribed by that first loop. A diagonal link of the conductive track may extend between the end of one loop and the beginning of the next to connect the two loops to form the spiral like pattern of the coil. The coil further comprises at least one segment arranged to reduce spatial variations in the H-field in an area circumscribed by the first loop. The at least one segment comprises at least one of a gap in the track or a meander in the track.

It will be appreciated by the skilled addressee in the context of the present disclosure that the first loop may be one complete turn of the spiral, and the second loop a further complete turn. In addition the end of the first loop and the beginning of the second loop may comprise lengths of track which are parallel on the surface of the substrate and connected by a diagonal link between them. Those lengths of track may be straight. The diagonal link between them may mark the completion of one loop and the commencement of the next.

The antennas of the present disclosure are carried on a substrate, for example the antenna may be attached to the substrate by any appropriate means. For example, the tracks of conductive material may provided by a method of additive manufacture for example a layer of the conductive material may be deposited on the substrate and etched away to define the tracks. As another example, a sheet like element, such as a foil, may be adhered to the substrate. This may also be etched away to define the tracks. As another example conductive material may be attached to the substrate in the form of a track—e.g. by a printing method such as 3D printing.

In embodiments, each loop comprises a respective segment—that is to say there is a segment in each loop. The segment may comprise a gap, such as a break (e.g. a discontinuity) in the track so that the substrate is left exposed between two adjacent lengths of track. Such a gap will introduce a degree of capacitive impedance.

The spacing across the surface of the substrate between a length of track in the first loop, and a length of track in the second loop may also provide a degree of electrical coupling (e.g. by way of capacitive coupling, such as so called parasitic capacitance) between those lengths of track. This coupling may depend on the size of that spacing (e.g. the distance of closest approach between the two lengths of track). A meander in one of two otherwise parallel lengths of track may provide a localised variation in the degree of electrical coupling between those two tracks. It may also provide a variation in the inductance of one of the two lengths of track, and/or the mutual inductance between the two tracks. Such a meander may comprise one or more winding curves or bends in the course of the track. Such a meander may provide a reduction and/or an increase in the spacing between two adjacent and otherwise parallel lengths of track.

One aspect of the disclosure provides an RF energy harvesting apparatus comprising an energy harvesting antenna carried on a substrate for fixing the antenna to an electrical device. The antenna comprises: (i) a first loop of conductive material carried on the substrate wherein the first loop comprises a plurality of gaps in the conductive material of the first loop; (ii) a second loop of conductive material on the substrate and inside the first loop, and (iii) a plurality of bridges of conductive material linking the first loop to the second loop.

It will be appreciated in the context of this disclosure that a loop of such an antenna (whether or not it includes gaps) may provide a looped path for carrying radio frequency current to allow energy harvesting.

In embodiments, the loops comprise conductive tracks and the size of the gaps in said tracks are selected to reduce spatial variations in at least one of: (i) the H-field; and (ii) the E-field, in the area surrounded by the second loop. The size of a gap in the conductive track may comprise a width of that gap—e.g. the separation of the adjacent portions of a length of track which define the gap in that length of track.

One aspect of the disclosure provides an RF energy harvesting apparatus comprising an energy harvesting antenna carried on a substrate for fixing the antenna to an electrical device. The antenna comprises: (i) a first loop, wherein the first loop comprises a track of conductive material carried on the substrate and circumscribing an area of the substrate, wherein the first loop comprises a plurality of gaps in the track of conductive material; (ii) a second loop of conductive material on the substrate and inside the first loop, and (iii) a plurality of bridges of conductive material linking the first loop to the second loop. The arrangement of at least one of (i) the gaps and (ii) the bridges are selected to reduce spatial variations in H-field in the area surrounded by the second loop.

It is to be appreciated in the context of this disclosure that the arrangement of the gaps comprises their spatial arrangement, e.g. their layout on the substrate. For example features of their arrangement such as their size, the loop in which they are provided, the locations of the gaps around the loops, the inter-gap distance, and the number of such gaps which may be present. Any of these features of their arrangement or other features of their arrangement may be selected to reduce spatial variations in H-field in the area surrounded by the second loop.

It will be appreciated in the context of the present disclosure that an antenna configured to reduce spatial variations in H-field in the area surrounded by the second loop may enable efficient near field coupling with an RF source emitting anywhere within that area. This may provide a more versatile antenna which can be secured (e.g. as a cover) to an RF emitting device such as a mobile telephone handset. It may be more versatile because a single type of antenna can be used with a wide variety of devices. Where, as is the case for many items of consumer electronics such as mobile telephone handsets, a wide variety of devices have similar external form factor. Accordingly, a single type of antenna with that form factor may be provided for attachment to any device of that size irrespective of its type, or the location of its RF emitter. It is not necessary to know the precise location of the RF emitter in any particular device. All that is required is that the RF source is emitting within the area surrounded by the second loop. And, efficient coupling can be assumed anywhere within the second loop because of the field homogeneity (reduced spatial variations). Therefore, RF power harvesting antennas may be provided and used which are not specific to the precise location of an RF source on any one device. It is to be understood in the context of this disclosure that depending on the size and dimensions of the antenna, any arrangement of the gaps and/or bridges could be chosen provided that it reduces spatial variations in H-field.

In embodiments, the size of the gaps in the track of the first loop are selected to reduce spatial variations in at least one of: (i) the H-field; and (ii) the E-field, in the area surrounded by the second loop.

In embodiments, the second loop also comprises a track of conductive material carried on the substrate and circumscribing an area of the substrate, and wherein said track comprises a plurality of gaps in the conductive material of the second loop.

In embodiments, the size of the gaps in the track of the second loop are selected to reduce spatial variations in at least one of: i) the H-field; and ii) the E-field, in the area surrounded by the second loop.

One aspect of the disclosure provides a dual loop power harvesting antenna for fixing to an electrical device to harvest power from the electrical device. The antenna comprises two concentric loops of conductive material both arranged between a common differential signal connection for connecting both loops to a power harvesting apparatus. The first of the two concentric loops comprises a track of conductive material carried on a substrate and circumscribing an area of the substrate, the first loop comprising a plurality of gaps in the track of conductive material. The second loop is inside the first loop on the substrate and of conductive material. The antenna comprises a plurality of bridges of conductive material linking the first loop to the second loop. The arrangement of at least one of (i) the gaps and (ii) the bridges are selected to reduce spatial variations in H-field in the area surrounded by the second loop.

In embodiments, the second loop comprises a track of conductive material carried on a substrate and circumscribing an area of the substrate, the second loop comprising a plurality of gaps in the track of conductive material.

In an aspect, there is provided an RF energy harvesting apparatus comprising an energy harvesting antenna carried on a substrate for fixing the antenna to an electrical device, wherein the antenna comprises: a shape defined on the substrate, the shape comprising a first portion and a second portion. The first portion comprises a track of conductive material carried on the substrate which traces out at least a portion of the first portion of the shape. The second portion comprises a track of conductive material carried on the substrate which traces out at least a portion of the second portion of the shape. The first portion may circumscribe an area of the substrate and the second portion is located within the circumscribed portion of the substrate. The first portion comprises at least one gap in the conductive track such that the conductive track does not trace out the entirety of the first portion of the shape defined on the substrate.

In embodiments, each portion comprises substantially one complete rotation or turn (i.e. through approximately 360°) about a central point within the second loop, the rotation being in a plane within the substrate. The first portion may define a shape which is similar to the second portion, only larger, so that the second portion may fit inside the first portion. In examples, the first portion may be connected to the second portion at the end of a complete turn of one of the portions. Each turn may be defined with respect to a connection between the two portions. For example, a value of 0° may be ascribed to the angle (from the centre of the turn) at which the first portion is connected to the second portion.

The shape defined on the substrate may comprise turns of a spiral, and the first portion forms a first turn of the coil and the second portion forms a second turn of the coil. A turn may be defined as starting from, and finishing at, the connection between the first and second portion. Each such portion may be provide a loop. In the case of coil embodiments a spiral coil may comprise at least two such portions each of which provides a turn of that spiral (e.g. a complete spiral turn). Each consecutive turn may provide a loop. A connection between the first portion and the second portion may comprise a diagonal link of the conductive track. The diagonal link extends between the end of one loop, or turn, and the beginning of the next to connect the two loops to form the spiral like pattern of the coil. The coil comprises at least one segment arranged to reduce spatial variations in the H-field in an area circumscribed by the first loop, wherein the at least one segment comprises at least one of a gap in the track or a meander as described elsewhere herein.

In embodiments, the shape defined on the substrate is a coil comprising two loops, and wherein the first portion comprises the first loop and the second portion comprises the second loop. The two loops may be substantially parallel—e.g. they may be concentric. The two loops may be configured such that the first loop is a larger version of the second loop such that the second loop fits inside the first loop on the substrate.

In embodiments, the antenna comprises a plurality of bridges of conductive material linking the first loop to the second loop. The arrangement of at least one of (i) the gaps and (ii) the bridges are selected to reduce spatial variations in H-field in the area surrounded by the second loop.

The features of any one of the antennae, loops or tracks described herein may be combined with any of the technically compatible apparatus described herein. Other examples and variations are contemplated within the scope of the appended claims.

The invention claimed is:

1. An RF energy harvesting apparatus comprising an energy harvesting antenna carried on a substrate for fixing the antenna to an electrical device, wherein the antenna comprises:
   a coil comprising two consecutive complete turns of a spiral like pattern provided by a track of conductive material carried on the substrate, wherein the coil provides two loops, wherein the two loops comprise a first loop provided by one of the consecutive complete turns of the spiral like pattern and a second loop provided by the other one of the consecutive complete turns, wherein the second loop is inside the first loop; and
   wherein at least one of the first loop and the second loop comprises at least one segment that includes at least one gap in the track that is a discontinuity in the track in which there is no conductive material or a meander, the gap in the track or the meander reduces spatial variations in the H-field in an area circumscribed by the first loop.

2. The RF energy harvesting apparatus of claim 1 wherein the at least one segment is arranged to reduce spatial variations in the H-field by introducing additional capacitive impedance into the antenna, and the arrangement of the at least one segment is selected to adjust the capacitive impedance of the antenna to reduce the spatial variations in the H-field.

3. The RF energy harvesting apparatus of claim 1 wherein the coil is provided by at least one elongate track on the substrate, and wherein the dimensions of the at least one elongate track are selected based on an operating frequency band of the antenna to adjust the impedance of the antenna at the operating frequency band and comprise at least one of: the length of the at least one elongate track, the width of conductive material forming the at least one elongate track, the thickness of the conductive material forming the at least one elongate track, the radius and/or circumference of the two loops, and the spacing between the two loops.

4. The RF energy harvesting apparatus of claim 1 wherein the two loops of the coil are further linked by at least one bridge of conductive material at a location on the coil to provide a shortened conductive path between one end of the coil and the other, and the at least one bridge has an impedance greater than that of the coil at the operating frequency band.

5. The RF energy harvesting apparatus of claim 4 comprising two bridges between the two loops, wherein each bridge is arranged on an opposite side of the coil to the other on the same face of the substrate.

6. The RF energy harvesting apparatus of claim 1 wherein each loop has at least one respective segment.

7. The RF energy harvesting apparatus of claim 1 wherein the segment arranged to reduce spatial variations comprises a segment with an impedance per unit length different to that of the rest of the coil per unit length at an operating frequency band.

8. The RF energy harvesting apparatus claim 1 wherein the spacing between the two loops is substantially constant around their circumference wherein the spacing between the two loops forms an annulus.

9. The RF energy harvesting apparatus claim 1 wherein the substrate is flexible.

10. The RF energy harvesting apparatus of claim 1 wherein the at least one segment is arranged to reduce spatial variations in the H-field by introducing an additional reactive impedance into the antenna, and the arrangement of the at least one segment is selected to adjust the reactive impedance of the antenna to reduce the spatial variations in the H-field wherein the segment comprises an inductor for introducing reactive impedance into the antenna.

11. The RF energy harvesting apparatus of claim 1 wherein the conductive material has a width that is substantially constant along its length.

12. The RF energy harvesting apparatus of claim 1 wherein the two loops are substantially rectangular with rounded corners wherein the two loops are concentric forming an annulus therebetween.

13. The RF energy harvesting apparatus of claim 1 wherein the dimensions of the coil are selected to match the impedance of a rectifier coupled to the antenna.

14. The RF energy harvesting apparatus of claim 1 wherein the dimensions of the coil are selected based on a first operating frequency band of the antenna.

15. The apparatus of claim 1 wherein first loop and second loop are both disposed on a first major surface of the substrate.

16. An RF energy harvesting apparatus comprising an antenna carried on a substrate for fixing the antenna to an electrical device, wherein the antenna comprises:
   a first loop of conductive material carried on the substrate wherein the first loop comprises a plurality of gaps arranged at a plurality of gap positions in the conductive material of the first loop,
   a second loop of conductive material on the substrate and inside the first loop, and
   a plurality of bridges of conductive material linking the first loop to the second loop, wherein the bridges are arranged at a plurality of bridge positions on the substrate;
   wherein the gap positions and bridge positions provide a substantially homogeneous H-field in the area surrounded by the second loop.

17. The apparatus of claim 16 wherein the size of the gaps are selected to reduce spatial variations in at least one of:
   (i) the H-field; and
   (ii) the E-field,
in the area surrounded by the second loop.

18. The apparatus of claim 16 wherein the H-field comprises an H-field induced by near field coupling to an RF signal, wherein the RF signal includes signal in at least one of:
   (i) the first operating frequency band of the antenna; and
   (ii) the second operating frequency band of the antenna.

19. The apparatus of claim 16 further comprising a rectifier on the substrate circumscribed by the second loop wherein the rectifier comprises two mutually similar rectification arms arranged electrically in parallel between an output coupling of the antenna and a DC output of the apparatus.

* * * * *